United States Patent
Denoueix et al.

(10) Patent No.: US 6,615,887 B2
(45) Date of Patent: Sep. 9, 2003

(54) TIRE HAVING IMPROVED ENDURANCE

(75) Inventors: Jean-Yves Denoueix, Blanzat (FR); Pedro Costa Pereira, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 09/878,808

(22) Filed: Jun. 11, 2001

(65) Prior Publication Data

US 2002/0011295 A1 Jan. 31, 2002

Related U.S. Application Data

(63) Continuation of application No. PCT/EP00/09865, filed on Oct. 9, 2000.

(30) Foreign Application Priority Data

Oct. 11, 1999 (FR) .............................. 99 12745

(51) Int. Cl.[7] .............................. B60C 9/22; B60C 9/20; B60C 11/00
(52) U.S. Cl. .............................. 152/209.5; 152/209.1; 152/526; 152/527; 152/531; 152/533; 152/537
(58) Field of Search ................................ 152/531, 533, 152/537, 527, 209.1, 209.5, 526

(56) References Cited

U.S. PATENT DOCUMENTS

| | | |
|---|---|---|
| 4,795,523 A | 1/1989 | Laurent et al. |
| 4,804,436 A | 2/1989 | Debroche et al. |
| 4,877,073 A | 10/1989 | Thise et al. |
| 4,895,692 A | 1/1990 | Laurent et al. |
| 4,963,207 A | 10/1990 | Laurent |
| 5,228,933 A | 7/1993 | Kawabata et al. |
| 5,277,238 A | 1/1994 | Kawabata et al. |
| 5,971,050 A | 10/1999 | Debroche |
| 6,000,454 A | 12/1999 | Barody et al. |
| 6,224,808 B1 | 5/2001 | Essinger et al. |
| 6,234,227 B1 | 5/2001 | Bosseaux |

FOREIGN PATENT DOCUMENTS

| | | | | |
|---|---|---|---|---|
| EP | 0 335 588 A2 | * | 10/1989 | ............ 152/531 |
| JP | 06071781 A | * | 3/1994 | ............ 152/537 |
| JP | 09002017 A | * | 1/1997 | ............ 152/533 |
| WO | 9925571 | | 5/1999 | |

OTHER PUBLICATIONS

English–language Abstract of JP 07 069 005, published Mar. 14, 1995, Bridgestone Corp.

* cited by examiner

Primary Examiner—Adrienne C. Johnstone

(57) ABSTRACT

A tire having a crown which includes a ply of circumferentially oriented, helically wound reinforcing threads. This ply is arranged such that in sensitive zones, for example, beneath the grooves of the tread pattern, the laying pitch of the circumferential reinforcing threads is greatly increased. This substantially reduces the risks of damage to the circumferential reinforcing threads in these zones.

11 Claims, 2 Drawing Sheets

TIRE HAVING IMPROVED ENDURANCE

This is a continuation of pending PCT/EP00/09865, filed Oct. 9, 2000.

BACKGROUND OF THE INVENTION

The invention relates to a vehicle tire, and in particular to a tire, the architecture of which is optimized to reinforce its endurance and its strength at high speed.

It is now conventional, in particular for tires for passenger vehicles intended to travel at high speeds, to use an additional ply of circumferentially oriented reinforcing threads to reinforce the crown. This ply may be arranged above the reinforcing crown plies at angles which are also conventionally used.

In such a configuration, this ply of circumferentially oriented reinforcing threads is the radially outermost ply of the crown of the tire and is the first to be subjected to the various attacks to which the tires may be subjected during travel.

Breaking of one or more of these circumferential reinforcing threads during travel may be harmful to the life of the tire, because such breaks reduce the hooping of the crown but also make it possible for water to infiltrate along the circumferential reinforcing threads, which may result in corrosion phenomena on the metal reinforcing threads.

Hereafter, "circumferential groove" will be understood to mean a groove arranged on the radially outer surface of the tire and oriented in the circumferential direction or substantially in this direction and continuous over the entire circumference of the tire.

"Axial width of a circumferential groove" is understood to mean the maximum axial width of the groove when it is strictly circumferential or, when it is oriented substantially circumferentially, that is to say with slight angling or undulation relative to this direction, the axial distance between the two circumferential planes which are arranged on either side of the groove and are each tangent to one of the faces of the groove.

"Linear density" is understood to mean the weight in grams of one thousand meters of a reinforcing thread. The linear density is expressed in tex. The stress to which a reinforcing thread is subjected or the modulus of this reinforcing thread are expressed in "cN/tex", cN meaning centinewton.

"Reinforcing thread" is understood to mean any reinforcement element in the form of a thread which is able to reinforce a given matrix, for example a rubber matrix. As reinforcing threads, mention will be made, for example, of multifilament yarns, these yarns possibly being twisted on themselves or not, unit threads such as single cords of high elementary diameter, with or without a twist on themselves, cabled yarns or plied yarns ("cords") obtained by cabling or plying operations on these unit threads or these yarns, such reinforcing threads possibly being hybrid ones, that is to say, composite ones, comprising elements of different natures.

"Plied yarn" (or "folded yarn") is understood to mean a reinforcing thread formed of two single yarns or more assembled together by plying operations; these single yarns, which are generally formed of multifilament yarns, are first of all plied individually in one direction (S or Z direction of twist) during a first plying stage, then twisted together in the opposite direction (Z or S direction of twist, respectively) during a second plying stage.

"Adherent reinforcing thread" is understood to mean a reinforcing thread which has undergone an appropriate coating treatment, referred to as sizing or adherization treatment, capable of making this reinforcing thread, after suitable heat treatment, adhere to the matrix for which it is intended.

"Laying pitch p" of a reinforcing thread oriented substantially circumferentially and helically wound is understood to mean the transverse distance between the axes of two adjacent turns of reinforcing thread. The laying pitch is the inverse of the "laying density d", which corresponds to the number of turns of reinforcing thread contained in a given axial width. Conventionally, d is expressed in the number of reinforcing threads per decimeter (f/dm) and p in millimeters, so p=100/d.

SUMMARY OF THE INVENTION

The subject of the invention is a tire comprising a crown extended by two sidewalls and two beads, a carcass anchored in the two beads, in which the crown comprises radially from the inside towards the outside: at least one reinforcement ply formed of parallel reinforcing threads oriented at an angle α relative to the circumferential direction of between 10 and 75 degrees, at least one ply of reinforcing threads which are oriented substantially circumferentially and are helically wound and extend axially substantially above the assembly of said reinforcement ply, and a tread having tread patterns on its outer face with at least one circumferential groove.

This tire is characterized in that, in the zones arranged radially between the circumferential groove and the reinforcement ply formed of reinforcing threads oriented α, the laying pitch for the reinforcing threads which are wound in a spiral is greater than or equal to the axial width of the circumferential groove.

Beneath the circumferential grooves of the tread pattern of the tire, the fact that the laying pitch of the reinforcing threads which are oriented circumferentially and helically wound is greater than or equal to the axial width of the groove means that, from one side of the groove to the other, there is at most only one winding of circumferential reinforcing thread. This embodiment therefore substantially reduces the probability of accidental breaking of these reinforcing threads and hence reinforces the strength of the tire overall.

This solution also has the advantage of avoiding excessive variation in width, when passing the grooves, of the belting rigidity provided by the circumferentially oriented reinforcing threads. This effect is all the greater, the higher the modulus of these circumferential reinforcing threads. This is also the case when the angle α of orientation of the reinforcing threads of the reinforcement plies increases, that is to say when the portion of the circumferential stresses which the circumferential reinforcing threads withstand increases relative to the portion which the reinforcement ply or plies having reinforcing threads oriented at the angle a relative to the circumferential direction withstand.

The circumferential reinforcing threads take up very high circumferential stresses. Consequently, any point of stoppage of these reinforcing threads is a zone of high shearing of the rubber mix which surrounds the reinforcing thread. Consequently, any point of stoppage is a zone favorable to the initiation and propagation of damage. The proposed solution has the advantage of not involving the occurrence of points of stoppage of the reinforcing threads beneath the grooves or in the vicinity thereof.

The proposed solution also has the advantage of not making the manufacture of the tire any more complex. It is a solution which is very easy to put into practice.

The laying pitch may advantageously be greater than or equal to twice the axial width of the circumferential groove. In this case, there is at least one half-circumference of the tire in which any axial section of the zone located between the groove and the reinforcement ply has no helically wound reinforcing thread.

Advantageously, the ply of reinforcing threads which are oriented substantially circumferentially is formed of at least two reinforcing threads helically wound simultaneously. This makes it possible to reduce the laying time for the ply. The maximum number of reinforcing threads which can be wound simultaneously is at most four.

Advantageously, the circumferential groove of the tire according to the invention has an axial width greater than or equal to 3.5 mm.

According to a specific embodiment, the tread of the tire is, over at least one given axial zone of the crown, in direct contact with the circumferentially oriented reinforcing threads. This facilitates building of the tire by reducing the number of products to be laid. When the tread comprises a first mix intended to come into contact with the ground, and an underlayer arranged radially beneath said first mix, it is the underlayer which is advantageously in direct contact with the circumferentially oriented reinforcing threads.

The reinforcing threads oriented substantially circumferentially and helically wound advantageously develop a stress under 3% deformation which is greater than 12 cN/tex, and preferably greater than 20 cN/tex. These reinforcing threads therefore have a high elasticity modulus at high deformations, which makes it possible for the ply which they form to assume all its functions, in particular the hooping of the crown at high speed.

These reinforcing threads may also have an initial modulus less than 900 cN/tex, and preferably less than 800 cN/tex. The low initial modulus of these reinforcing threads has the advantage of improving the comfort of the tire and reducing its coast-by noise at low speed.

Such reinforcing threads may be formed by the assembly of at least one single yarn of nylon associated with at least one aramid single yarn.

DESCRIPTION OF THE DRAWINGS

A number of embodiments of the invention will now be described with reference to the appended drawings, in which.

DESCRIPTION OF PREFERRED EMBODIMENTS

Figure 1:
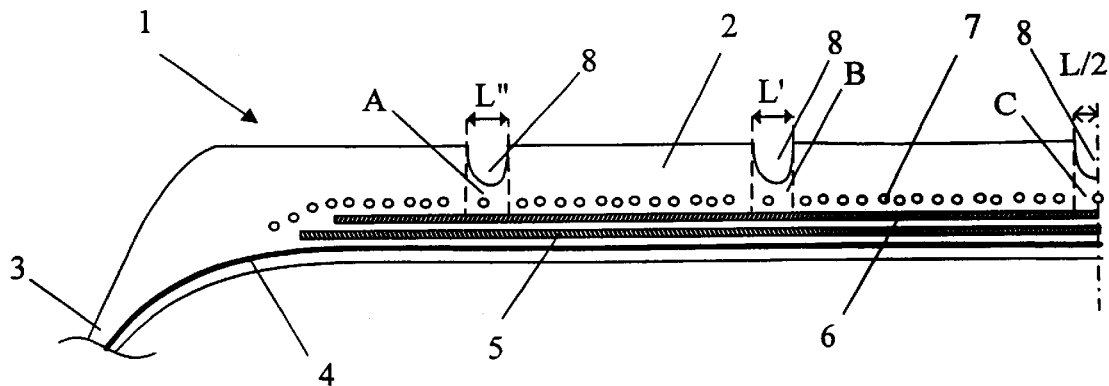
FIG. 1 shows an axial half-section through a tire according to the invention.

FIG. 1 shows a diagrammatic axial half-section through a tire 1 according to the invention. This tire comprises a crown 2, extended by two sidewalls 3 and two beads (not shown). The crown comprises a carcass ply 4 anchored in known manner in the two beads, two reinforcement plies 5 and 6 formed of reinforcing threads which are parallel within each ply and are crossed from one ply to the next, forming with the circumferential direction angles (αβ) of about 30 degrees and a ply 7 of reinforcing threads which are oriented substantially circumferentially. The carcass ply 4 is oriented substantially at 90 degrees relative to the circumferential direction; it is a radial carcass ply.

The ply 7 of circumferentially oriented reinforcing threads is formed of textile reinforcing threads wound helically to ensure effective hooping of the crown 2. The ply may be produced by winding helically the reinforcing thread on its own, that is to say that the reinforcing thread is not embedded in a rubber strip. This reinforcing thread is also applied directly to the rubber mix radially directly adjacent internally. Preferably, 2 to 4 reinforcing threads are laid at a time. In the example of FIG. 1, these textile reinforcing threads are an adherent plied yarn of a linear density of 521 tex produced from two identical aramid single yarns of 167 tex which are overtwisted individually at 280 turns/m and a nylon single yarn of 140 tex overtwisted at 280 turns/m, these three single yarns then being plied simultaneously at 280 turns/m in the opposite direction. The initial modulus of this reinforcing thread is equal to 740 cN/tex and the stress developed under 3% deformation is equal to 30 cN/tex.

Figure 4:
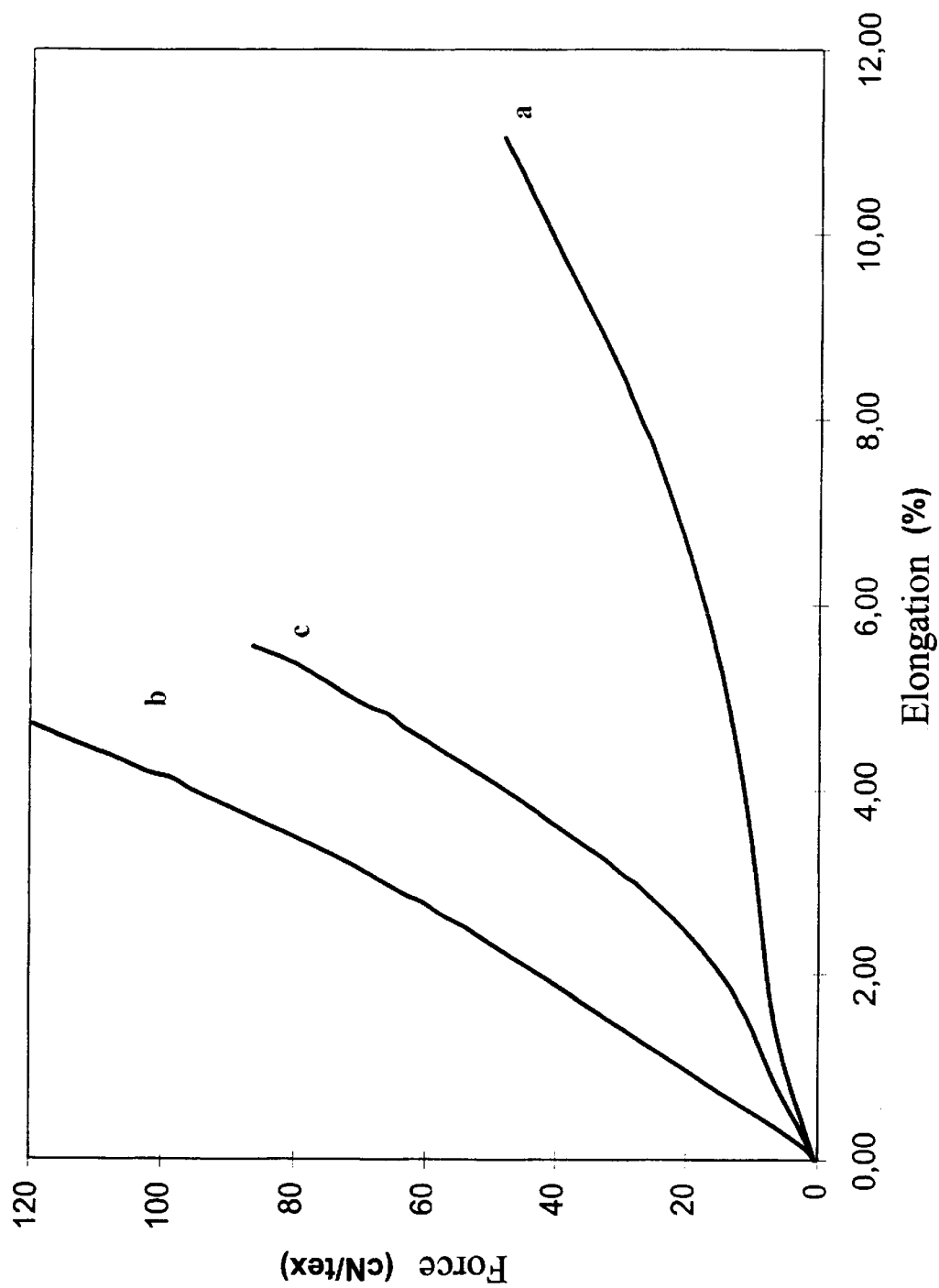
FIG. 4 shows the force-elongation curves of three types of reinforcing threads described hereafter.

FIG. 4 shows a force-elongation curve for this reinforcing thread (curve c) and also those of two other conventional reinforcing threads:

curve a: nylon reinforcing thread (2 single yarns of nylon of 441 tex);

curve b: aramid reinforcing thread (2 aramid single yarns of linear density 167 tex);

curve c: nylon aramid reinforcing thread.

The nylon reinforcing thread (curve a) is an adherent plied yarn of a linear density of 441 tex produced from 2 identical nylon single yarns of 210 tex overtwisted individually at 200 turns/meter then plied simultaneously at 200 turns/m in the opposite direction. The initial modulus of this reinforcing thread is equal to 530 cN/tex and the stress developed under 3% deformation is 9 cN/tex. This reinforcing thread therefore has a low elasticity modulus at low and at high deformations.

The aramid reinforcing thread (curve b) is an adherent plied yarn of a linear density of 376 tex produced from two identical aramid single yarns of 167 tex overtwisted individually at 440 turns/m and then plied simultaneously at 440 turns/m in the opposite direction. The initial modulus of this reinforcing thread is equal to 2030 cN/tex and the stress developed under 3% deformation is 68 cN/tex. This reinforcing thread has a high elasticity modulus.

The reinforcing threads illustrated in curves b and c have the advantage of having a high elasticity modulus at high deformations, which provides them with great effectiveness for hooping the crowns of the tires while limiting the necessary density of reinforcing threads. The nylon aramid reinforcing thread also has a low initial modulus, which has the advantage of improving the comfort of the tire and reducing its coast-by noise at low speed.

The tire 1 comprises in its axial half-section shown in FIG. 1 three grooves 8, a central groove and two lateral grooves. These grooves 8 are circumferential, of axial widths L, L' and L" respectively. The axial width of these three grooves is greater than 3.5 mm. In the annular zones C, B and A respectively, FIG. 1 shows that there is only a single reinforcement reinforcing thread of the ply 7 present. This makes it possible to limit the risks of degradation of this reinforcing thread in these sensitive zones.

Figure 2:
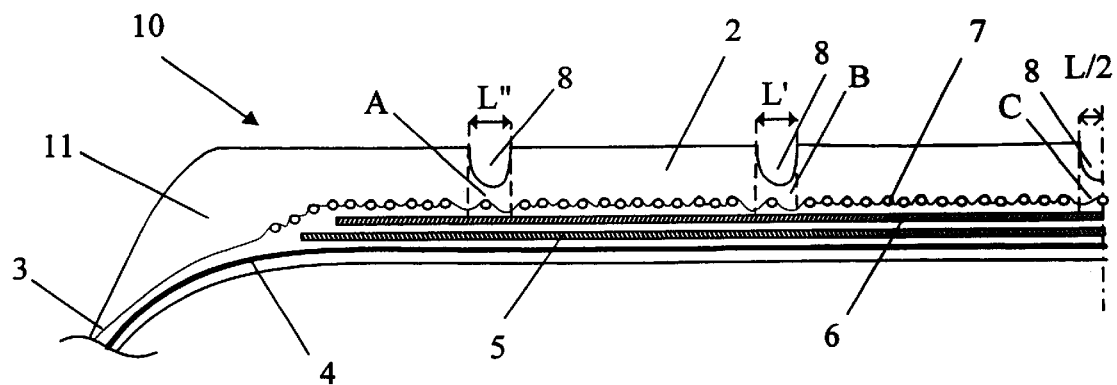
FIG. 2 shows an axial half-section through a second embodiment of a tire according to the invention.

FIG. 2 shows an axial half-section through a tire 10 according to the invention. In this embodiment, the tread 11 is in direct contact with the reinforcement reinforcing threads of the ply 7. This means that the rubber mix forming the tread 11 is applied by winding a strip directly on the circumferential reinforcing threads without the interposition of any connecting rubber. This facilitates the manufacture of the tire by reducing the number of different products which have to be laid and also the time necessary for this manufacture.

In the case of a hybrid 167* 167* 140 at 100 f/dm (the laying pitch is therefore 1 mm), this arrangement comes down to removing 4 to 5 hooping reinforcing threads from beneath each circumferential groove. Given the high modulus at high deformations, the excess tension in centrifugation is very low.

Figure 3:
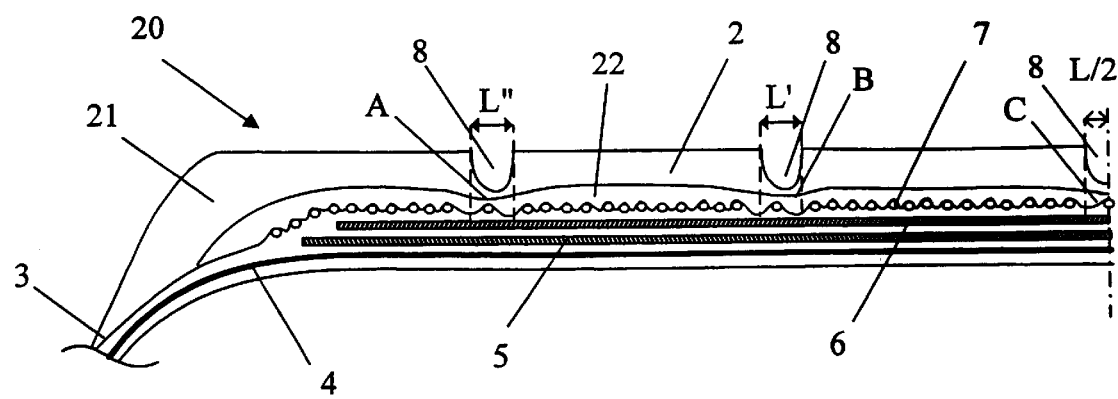
FIG. 3 shows a third embodiment of a tire according to the invention.

In FIG. 3, the tire 20 comprises, between the tread 11 and the ply of circumferentially oriented reinforcing threads 7, an underlayer 22. This underlayer 22 is applied directly to the reinforcing threads of the ply 7.

According to a first embodiment, the building of the tire according to the invention may advantageously be effected on a rigid core which imposes the form of its inner cavity, such as those described by EP 242 840 or EP 822 047. There are applied to this core, in the order required by the final architecture, all the constituents of the tire, which are arranged directly in their final position, without undergoing shaping at any moment of the building operation. The curing is effected on the core, the latter not being removed until after the vulcanization phase. This building operation may in particular use the devices described in Patents EP 0 243 851 for laying the threads of the carcass reinforcement, EP 0 248 301 for laying the crown reinforcing threads and EP 0 264 600 for laying the rubber compounds.

This method of manufacture has the advantage of greatly reducing or even eliminating the pre-stresses imposed on the reinforcing threads, particularly those oriented at 0°, during the conventional shaping phases.

It is also possible partially to cool the solid tire on the core in order to keep the reinforcing threads in the state of deformation imposed upon laying.

It is also possible, equivalently, to manufacture the tire on a drum such as described in WO 97/47 463 or EP 718 090, provided that the shaping of the blank of the tire is effected before laying the circumferentially oriented reinforcing threads.

It is also possible to lay the circumferentially oriented reinforcing threads on a form having an identical geometry to the shape intended in the curing mold. The crown block is then assembled with the complementary blank of the tire according to transfer techniques known to the person skilled in the art, then, still using known principles, the tire is fitted and pressurized by unfolding a membrane within the tire.

This method of production also guarantees the absence of pre-stresses due to the shaping in a vulcanization press.

All these embodiments make it possible to ensure that the circumferentially oriented reinforcing threads are helically wound with diameters of lay which differ, over the entire width of the crown 2, by less than 0.5% from the final diameters of these reinforcing threads in the tire after vulcanization.

We claim:

1. A tire comprising a crown extended by two sidewalls and two beads, a carcass anchored in the two beads, said crown comprising radially from the inside towards the outside:
    at least one reinforcement ply formed of parallel reinforcing threads oriented at an angle α relative to the circumferential direction of between 10 and 75 degrees,
    at least one ply of reinforcing threads which are oriented substantially circumferentially and are helically wound and extend axially substantially above the axial width of said at least one reinforcement ply, and
    a tread having tread patterns on its outer face with at least one circumferential groove, the tire characterized in that, in each zone arranged radially between one of said at least one groove and said at least one reinforcement ply formed of reinforcing threads oriented at α, the laying pitch for said reinforcing threads which are helically wound is greater than or equal to twice the axial width of said groove.

2. A tire according to claim 1, in which said at least one ply of circumferentially oriented reinforcing threads is formed of at least two reinforcing threads helically wound simultaneously.

3. A tire according to claim 2, in which the at least two reinforcing threads helically wound simultaneously are at most four reinforcing threads helically wound simultaneously.

4. A tire according to claim 1, in which said at least one circumferential groove has an axial width greater than or equal to 3.5 mm.

5. A tire according to claim 1, in which said tread is in direct contact with said reinforcing threads which are helically wound over at least one given axial zone of said crown.

6. A tire according to claim 1, in which the tread comprises a first mix intended to come into contact with the ground and an underlayer arranged radially beneath said first mix, and in which, over at least one given axial zone of said crown, said underlayer is in direct contact with said helically wound reinforcing threads.

7. A tire according to claim 1, in which the circumferentially oriented reinforcing threads develop a stress under 3% deformation greater than 12 cN/tex.

8. A tire according to claim 7, in which the circumferentially oriented reinforcing threads develop a stress under 3% deformation greater than 20 cN/tex.

9. A tire according to claim 7, in which said circumferentially oriented reinforcing threads have an initial modulus of less than 900 cN/tex.

10. A tire according to claim 9, in which said circumferentially oriented reinforcing threads have an initial modulus of less than 800 cN/tex.

11. A tire according to claim 1, in which said circumferentially oriented reinforcing threads are formed of an assembly of at least one single yarn of nylon associated with at least one aramid single yarn.

* * * * *

UNITED STATES PATENT AND TRADEMARK OFFICE
CERTIFICATE OF CORRECTION

PATENT NO.   : 6,615,887 B2
DATED        : September 9, 2003
INVENTOR(S)  : Denoueix et al.

It is certified that error appears in the above-identified patent and that said Letters Patent is hereby corrected as shown below:

Column 2,
Line 29, "$\alpha$" should read -- at $\alpha$ --
Line 53, "angle a" should read -- angle $\alpha$ --

Column 3,
Line 67, "$(\alpha\beta)$" should read -- $(\alpha, \beta)$ --

Column 5,
Line 8, "167* 167* 140" should read -- 167*167*140 --

Signed and Sealed this

Ninth Day of December, 2003

JAMES E. ROGAN
*Director of the United States Patent and Trademark Office*